No. 631,128. Patented Aug. 15, 1899.
W. M. RICKETTS.
RAIN WATER FILTER.
(Application filed Jan. 21, 1899.)
(No Model.)

Witnesses
A L Phelps
J H Travel

Inventor
William M. Ricketts
By his Attorney
C. C. Shepherd

THE NORRIS PETERS CO., PHOTO-LITHO., WASHINGTON, D. C.

UNITED STATES PATENT OFFICE.

WILLIAM M. RICKETTS, OF COLUMBUS, OHIO.

RAIN-WATER FILTER.

SPECIFICATION forming part of Letters Patent No. 631,128, dated August 15, 1899.

Application filed January 21, 1899. Serial No. 702,949. (No model.)

*To all whom it may concern:*

Be it known that I, WILLIAM M. RICKETTS, a citizen of the United States, residing at Columbus, in the county of Franklin and State of Ohio, have invented a certain new and useful Improvement in Rain-Water Filters, of which the following is a specification.

My invention relates to the improvement of rain-water filters; and the objects of my invention are to provide a filter of this character of improved construction and adapted to be connected with or made to intersect an ordinary house rain-water-conducting pipe and to produce other improvements the details of construction of which will be more fully pointed out hereinafter. These objects I accomplish in the manner illustrated in the accompanying drawings, in which—

Figure 1:
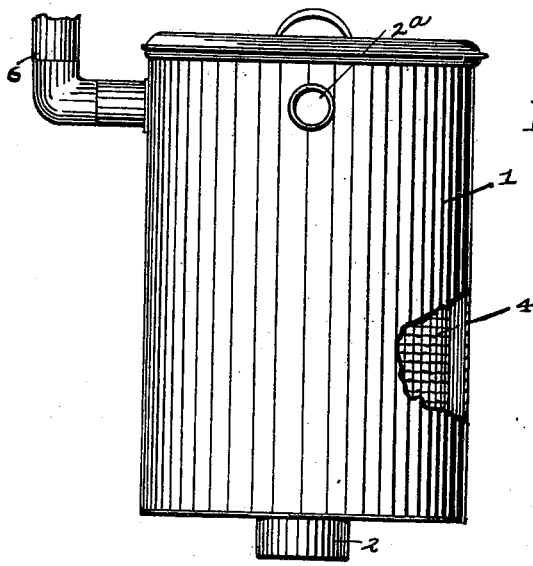
Figure 2:
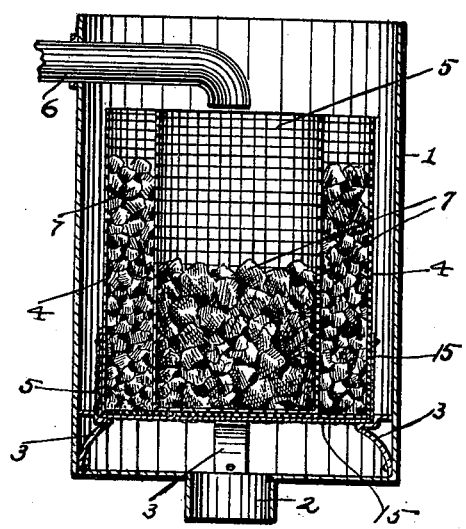
Figure 3:
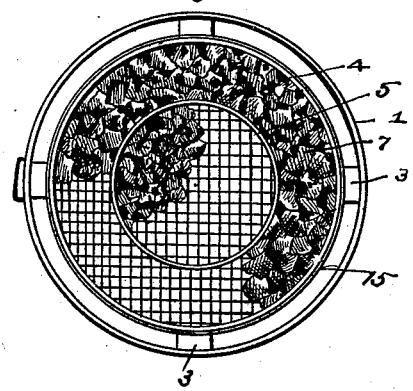

Figure 1 is a view in elevation of my improved filtering device. Fig. 2 is a central vertical section of the same, and Fig. 3 is a plan view with the cover removed and the rain-water-inlet pipe being omitted for the sake of clearness.

Similar numerals refer to similar parts throughout the several views.

In carrying out my invention I employ an external casing or filter-box 1, which may be of the cylindrical form shown or other suitable form in cross-section, said casing being provided in its bottom portion with a central outlet-neck 2. The casing is also provided in its upper portion, as indicated at $2^a$, with an overflow-outlet. Secured at suitable intervals to the inner wall of the casing 1 and projecting therefrom near the bottom of said casing are supporting-brackets 3, on which is seated a basket or filter-retaining receptacle 4, the latter being formed of screen or woven wire and having its upper side open. Within the basket 4 I provide a smaller cylindrical and similarly-formed basket 5, the lower side of which rests upon the wire floor of the basket 4. I incase the lower end portion of the outer basket 4 with a piece of loosely-woven fabric, which is indicated at $5^a$.

The outlet-neck 2 of the casing 1 is adapted to be connected with that section of a rain-water-conducting pipe which leads directly to a cistern, while an upper section of the rain-water pipe is, as indicated at 6, made to discharge centrally into the upper portion of said casing 1. Within the inner cylindrical basket 5 and between the latter and the outer basket 4 is deposited the desired quantity of charcoal or other suitable filtering material 7.

From the construction above described it will be seen that the rain-water from the pipe 6 is discharged within the casing 1 and prior to its escape through the outlet 2 is subjected to the cleansing and purifying action of the filtering material contained within the baskets. It will also be seen that by the employment of the fabric 5 the outgoing water is strained and particles of charcoal or other filtering material are prevented from passing into the cistern.

It is obvious that the filtering device herein described may be made to intersect any house rain-water pipe and result in the discharge of filtered water into the cistern or other receptacle.

Having now fully described my invention, what I claim, and desire to secure by Letters Patent, is—

In a filtering device, the combination with a casing 1 having a section of rain-water-conducting pipe discharging therein, and an outlet in the bottom of said casing, of an overflow-opening in the upper portion of said casing, cylindrical wire baskets 4 and 5 arranged one within the other and supported within said casing, a fabric covering for the lower end portion of the basket 4 and filtering material contained in said baskets, substantially as specified.

WILLIAM M. RICKETTS.

In presence of—
 A. L. PHELPS,
 EDWARD M. TAYLOR.